June 28, 1949.  J. E. HENRY ET AL  2,474,248
PHOTOGRAMMETRIC CALIPER
Filed April 30, 1948
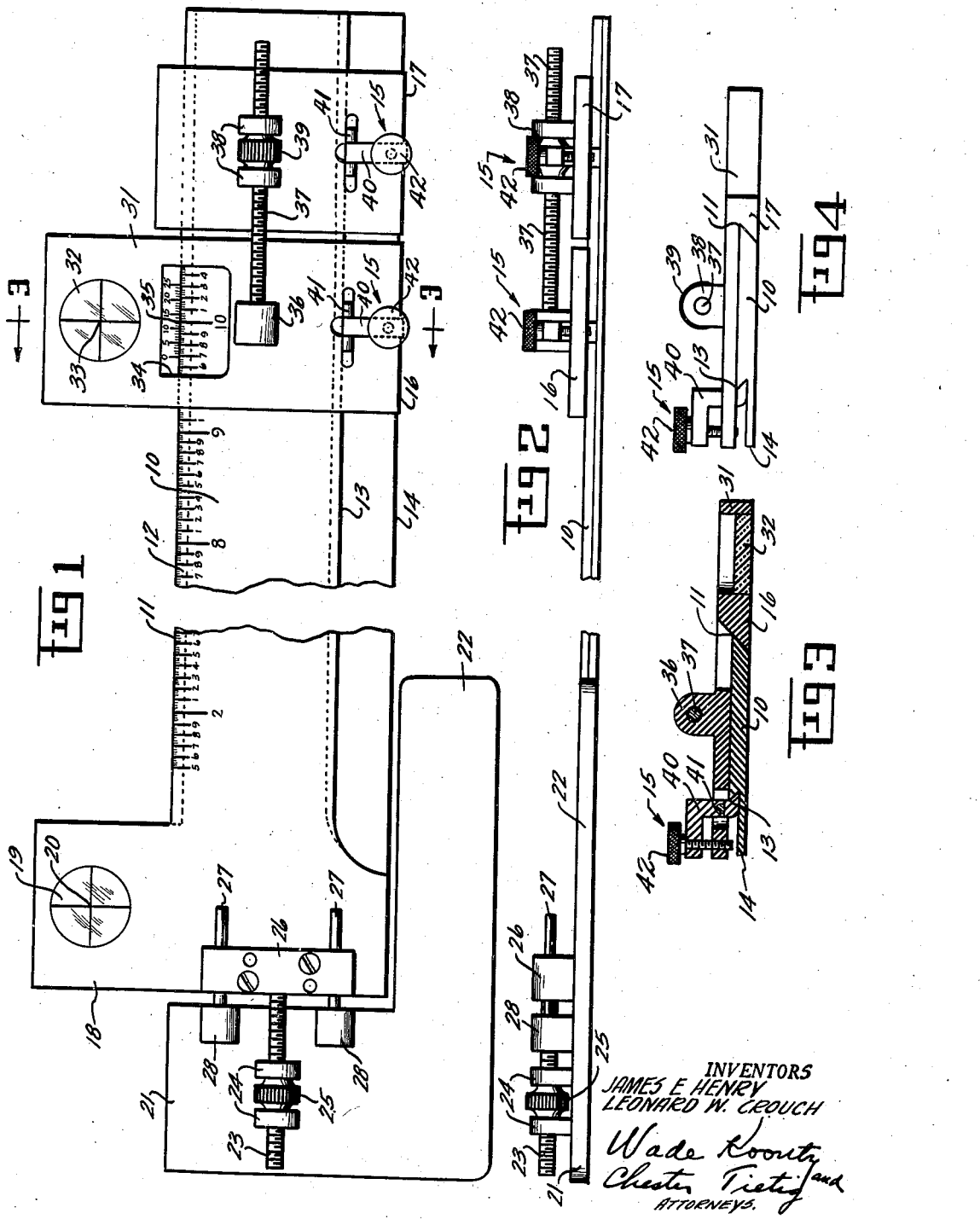
INVENTORS
JAMES E. HENRY
LEONARD W. CROUCH
Wade Koontz
Chester Tietig and
ATTORNEYS.

Patented June 28, 1949

2,474,248

UNITED STATES PATENT OFFICE 2,474,248

PHOTOGRAMMETRIC CALIPER

James E. Henry and Leonard W. Crouch, Dayton, Ohio

Application April 30, 1948, Serial No. 24,296

6 Claims. (Cl. 33—125)

(Granted under the act of March 3, 1883, as amended April 30, 1928; 370 O. G. 757)

The invention described herein may be manufactured and used by or for the Government for governmental purposes without payment to us of any royalty thereon.

This invention relates to a caliper suitable for ascertaining distances between selected points on photographs of terrain taken from aircraft.

For military purposes it is often necessary to know very accurately the distance between such points on paper since a knowledge of the elevation at which the photograph was taken will then enable the actual distance between the points on the terrain itself to be calculated by triangulation.

One object of the invention is to provide a caliper with which the initial point, as well as the end point can be very accurately registered under a cross hair by a screw adjustment.

Another object is to provide such an instrument of the vernier type in which all of the projecting adjusting means are above the body of the caliper, hence do not interfere with its movement over the paper.

Another object is to provide a caliper which has a preliminary-setting block, so that exact adjustment to the initial point can be made with a screw adjustment.

In the drawings:

Fig. 1 is a plan view of the caliper,

Fig. 2 is a side elevation,

Fig. 3 is a cross section taken on the line 3—3 of Fig. 1, and

Fig. 4 is an end view taken from the right hand end of Fig. 1.

The caliper comprises a body 10 of considerable length, the upper edge of which is provided with a scale 12. The upper edge 11 and the lower edge 13 are both beveled but the lower edge 13 is provided with a narrow shelf or extension 14. The shelf 14 serves as a track for the sidewise movement of detents 15 which are adapted to set the positions of a pair of slides 16 and 17 which are traversibly mounted on the body 10. At the left side of the body, as shown in Fig. 1, there is an integral extension 18 in which there is a transparent disc or window 19 which may be a magnifying lens. The disc 19 is provided with vertical and horizontal cross hairs 20.

Also on the left end of the body 10 there is a preliminary-setting block 21, with which a handhold 22 is integral. The handhold 22 is intended to be held down on the photograph with one hand of the operator while he accomplishes the accurate initial setting of the caliper with the other. By such "setting" is meant the location of the vertical cross hair over the point on the photograph from which the distance to a second point is to be measured. A preliminary-setting screw 23 is therefore provided to connect adjustably the preliminary-setting block 21 and the body 10. The screw 23 is supported over the block 21 by means of two guides 24, between which there is a round, knurled nut 25. Rotation of the nut 25 advances or retracts the block 21 because the screw 23 is nonrotatably anchored in a thrust and guide block 26 which is erected on the extreme left edge of the body 10. The thrust block 26 is provided with a pair of holes (not shown) which form bearings for a pair of guide pins 27. The latter are integral with or rigidly attached to a pair of guide pin holders 28 on the right hand edge of the preliminary-setting block. The guide pins prevent rotation of the block 21 in respect to the body 10 and maintain the lower surfaces of both the block 21 and the body 10 in exactly the same plane.

Adjustable along the body 10 are a vernier-scaled slide 16 and end-point setting slide 17, the former being to the left of the latter. The vernier-scaled slide 16 has an upper extension 31 in which there is a window 32 which is provided with cross hairs 33. The latter are used for locating the end point on the photograph. The slide 16 is provided with a window 34 through which may be seen the body scale 12 and also a vernier scale 35 which abuts the scale 12 edge to edge. A thrust block 36 mounted on the top central surface of the vernier-scaled slide 16 serves to hold a screw 37, which is similar to screw 23, rigid. A pair of guides 38 similar to guides 24 and a round knurled nut 39, similar to nut 25 are arranged as in the corresponding assembly on block 21 and are mounted on the end-point setting slide 17. On both slides 16 and 17 there are detents 15, the construction of which can be seen in Figs. 3 and 4. The detent comprises a shoulder 40 which arises from a beveled portion 13. A pin 41 pinions the shoulder 40 to the slide 16. An adjustable screw 42 threadedly engages the shoulder 40 and the slide 16 so that the screw may be extended to engage the body, the extension 14 and bar against it thereby creating pressure on the top edge of bevel 13. This pressure serves to lock the slide 16 against longitudinal movement in respect to the body 10. No novelty per se is claimed for the construction of the detents; any suitable known construction may be substituted for that which is shown.

In operation, the caliper is laid down on the photograph which rests on as flat and hard a surface as is available. The instrument is positioned with the cross hairs 20 and 33 separated slightly more than the distance between the points to be located. The cross hairs 20 and 33 are each brought as close to their respective initial and end points as may be in a preliminary laying of the instrument. Then one hand firmly holding the caliper down by the handhold 22, the nut 25 is rotated to impart thrust to the screw 23 to push the body 10 and its appurtenances to the right to center the vertical hair of cross hairs 20 over the point from which it is desired to measure. This having been accomplished, the left hand is used to hold the body 10 down and the nut 39 is rotated to cause the screw 37 to push the vernier slide 16 to the left. During this operation the detent on end-point setting slide 17 should be tight to give the screw 37 a fulcrum to push against. When the vertical cross hair of cross hairs 33 is over the end point the operator locks the vernier-scaled slide detent 15. It is to be understood that the points located by the vertical cross hairs are also very close to the horizontal cross hairs, although they need not be precisely under them except for work demanding the ultimate of accuracy. Good accuracy is obtainable when both points are either above or below the horizontal cross hairs to the same extent and in the same direction. Having one point above the horizontal cross hair and the other below it is to be avoided.

The vernier scale 35 is read in the usual manner. The preferred graduation is in fortieths of an inch on the scale 12. On the vernier scale, six-tenths of an inch are divided by twenty-five lines. On the main scale 12, six-tenths of an inch are divided by twenty-four lines. The scales are read therefore by noting first the number of tenths of an inch that the zero of the vernier scale has passed on the main scale, then the number of fortieth divisions and finally the number of divisions on the vernier where a line coincides with a succeeding fortieth line on the main scale. The number of that line on the vernier scale gives the number for the third decimal place in the answer. For example, the correct reading shown in Fig. 1 in the drawing is 9.688 inches. The caliper therefore enables one to make a reading to one-thousandth of an inch.

We claim as our invention:

1. In a photogrammetric caliper, of the kind having a body which has at least one straight edge of substantial length, said edge being provided with a scale, and a vernier scaled slide cooperating with said body, the improvement which comprises a preliminary-setting block located at one end of said body, a preliminary-setting screw extending from said body to said block, a transverse extension on said body, a transparent window set in said extension, longitudinal and transverse cross hair indicia for said window and a similar transverse extension on said vernier scaled slide, a similar setting screw adapted to act as an end-point-setting screw for said vernier, a similar window in said slide transverse extension and similar cross hairs for said window, an end-point-setting slide adapted to act as a fulcrum for said end-point setting screw whereby after the first approximate location of the caliper upon an aerial photograph the transverse cross hair of the first window may be placed over a zero point by manipulation of the preliminary-setting screw and the distance from said transverse cross hair to the second transverse cross hair may be read after setting said second cross hair over a second point, said reading being along the scale of the body and by means of the cooperating scales on the body and on the vernier scaled slide.

2. A photogrammetric caliper according to claim 1 having in addition the improvement which comprises a handhold, the latter being an extension of the preliminary-setting block along a portion of the lower edge of said body.

3. A photogrammetric caliper according to claim 1 having in addition the improvement which comprises a pair of guide pins extending from said preliminary-setting block, a guide block on said body to slidably receive said pins, the latter extending from said preliminary setting block to said body parallel to said preliminary setting screw and to a sufficient length to permit substantial latitude in making the initial adjustment.

4. A photogrammetric caliper according to claim 1 having in addition the improvement which comprises means for locking said end-point-setting slide and vernier scaled slide at a multiplicity of selected points along said body scale in order by means of said end-point-setting screw to register said transverse cross hair over said second point with great exactness.

5. A photogrammetric caliper according to claim 1 having in addition the improvement which comprises that construction in which all of the slides, screws, guides and stops are positioned no lower than the lowest longitudinal surface of the body considered when the device is resting upon said surface so that they may be shifted on the body without disturbing the setting thereof.

6. In a photogrammetric caliper a body, a transverse extension at the left of said body, a window in said extension, a cross hair in said window, a preliminary setting block at the left of said extension, a hand-hold integral with said preliminary setting block, said hand-hold extending for a substantial distance along the lower longitudinal edge of said body, screw guides on said preliminary setting block, a thrust block near the left edge of said body, a screw extending through said guides, a hand-rotatable nut cooperating with said screw between said guides, alignment guides extending from said preliminary setting block into said thrust block whereby to hold said preliminary setting block and said body in alignment as regards their lowest longitudinal surfaces, an end-point-setting slide movable along the body, a vernier slide on the left of the end-point-setting slide, a window in said vernier slide, a cross hair in said window, said cross hair being substantially in alignment with the cross hair in said body extension window, a scale extending along the top edge of said body, a vernier scale carried by said vernier slide on a beveled surface bounding an opening in said slide, a plurality of alignment guides on said end-point-setting slide, a screw extending through said guides, a hand-rotatable nut mounted between said guides to cooperate with said screw, a thrust block on said vernier slide to receive the thrust of said screw and a detent on each of the end-point-setting slide and the vernier slide whereby either of said slides may be locked to the body independently of the other slide.

JAMES E. HENRY.
LEONARD W. CROUCH.

REFERENCES CITED

The following references are of record in the file of this patent:

UNITED STATES PATENTS

| Number | Name | Date |
| --- | --- | --- |
| 2,225,500 | Kelsey | Dec. 17, 1940 |

FOREIGN PATENTS

| Number | Country | Date |
| --- | --- | --- |
| 338,186 | Great Britain | Nov. 10, 1930 |